United States Patent [15] 3,676,455
Haug et al. [45] July 11, 1972

[54] HYDANTOIN DIISOCYANATES

[72] Inventors: Theobald Haug, Frenkendorf; Hans Batzer, Arlesheim, both of Switzerland

[73] Assignee: Ciba-Geigy Corporation

[22] Filed: April 8, 1970

[21] Appl. No.: 26,778

[30] Foreign Application Priority Data

April 15, 1969 Switzerland ..................5664/69

[52] U.S. Cl. ............... 260/309.5, 260/2.5 AT, 260/47 CB, 260/75 NT, 260/77.5 NC, 260/77.5 CH, 260/77.5 AT
[51] Int. Cl. .......................................C07d 49/32
[58] Field of Search..................................260/309.5

[56] References Cited

UNITED STATES PATENTS 3,391,097 7/1968 Williamson ........................260/309.5
3,449,353 6/1969 Porret et al. ........................260/309.5
3,542,803 11/1970 Porret ................................260/309.5
3,591,590 7/1971 Haug et al. .........................260/309.5
3,592,823 7/1971 Porret ................................260/309.5

Primary Examiner—Natalie Trousof
Attorney—Harry Goldsmith, Joseph G. Kolodny and Mario A. Monaco

[57] ABSTRACT

New bis-(1'-γ-isocyanatopropylhydantoinyl-3')-alkanes, for example 1,6-bis-[1'-(-γ-isocyanatopropyl)-5',5'-dimethylhydantoinyl-3']-n-hexane and 1,1'-methylene-bis-(3-γ-isocyanatopropylhydantoins), for example 1,1'-methylene-bis-(3-γ-isocyanatopropyl-5,5-dimethylhydantoin), and their use for the manufacture of polyurethanes by reaction of the new diisocyanates with polyhydroxyl compounds. The new diisocyanates are completely odorless and an irritation of the mucous membranes by these new diisocyanates has hitherto not been observed. The new diisocyanates are therefore preferentially used in the lacquer field.

6 Claims, No Drawings

HYDANTOIN DIISOCYANATES

It is known to react organic molecules which contain one or more isocyanate groups, with organic compounds which possess one or more OH groups. Urethanes are thereby obtained. Fundamentally it is possible to add all hydrogen atoms replaceable by alkali metal in organic molecules to isocyanate groups.

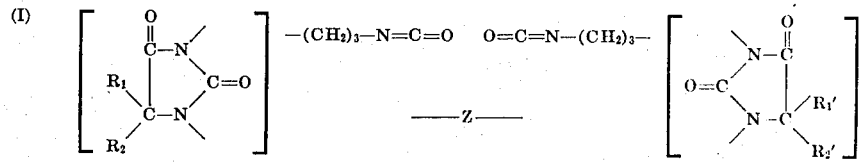

Organic diisocyanates or polyisocyanates are extensively used for the manufacture of polyurethanes. For this purpose, organic diisocyanates or polyisocyanates are reacted with diols or polyalcohols, for example polyester glycols or polyether glycols. In accordance with the isocyanates and alcohols employed, and following suitable processes, polyurethanes are thereby produced which find use as fibers, films, foams, adhesives or mouldings. The manufacture of polyurethanes is described in summary in Vieweg-Höchtlen, Kunststoffhandbuch (Plastics Handbook) Volume 7, page 207 and thereafter.

Further, organic diisocyanates or polyisocyanates can be used for the manufacture of polyureas, wherein organic diisocyanates or polyisocyanates are reacted with organic diamines or polyamines. Since the isocyanate group can add to urea groupings already formed, branched or crosslinked polyureas containing biuret groups are easily produced.

The diisocyanates used in industry, such as for example hexamethylenediisocyanate, phenyl-1,4-diisocyanate toluylene-2,4-diisocyanate and toluylene-2,6-diisocyanate, possess unpleasant physiological properties, for which reason their processing demands expensive protective measures or these disadvantageous properties have to be eliminated by converting the diisocyanates into higher molecular isocyanates of low volatility. For example, 2,4-toluylene-diisocyanate is dimerised to give 1,3-bis-(4'-methyl-3'-isocyanato-phenyl)-uretdione (a product of Messrs. Bayer, commercially available under the registered trade name "Desmodur TT"), or 3 molecules of 2,4-toluylenediisocyanate are added to 1 molecule of 1,1,1-trimethylolpropane, whereby an aromatic isocyanate containing urethane groups, which in the ideal case is trifunctional, is produced (a product of Messrs. Bayer, commercially available under the registered trade name "Desmodur L", having an isocyanate content of about 19.2 percent), or 3 mols of 1,6-hexamethylenediisocyanate (registered trade name "Desmodur H") are reacted with one mol of water, whereby an aliphatic isocyanate containing biuret groups, which in the ideal case is again trifunctional, is produced (a product of Messrs. Bayer, commercially available under the registered trade name "Desmodur N", having an isocyanate content of 26.3 percent).

It has now been found that the use of certain diisocyanates which have hitherto not yet been described in the literature and which contain two heterocyclic nuclei, and in particular 1,1'-methylene-bis-(3-γ-isocyanatopropyl-hydantoins) and 3,3'-alkylene-bis-(1-γ-isocyanatopropyl-hydantoins) is particularly interesting for the manufacture of urethanes and polyureas for certain applications. In contrast to the aliphatic and aromatic diisocyanates which are not physiologically harmless, such as 1,6-hexamethylenediisocyanate and 2,4-toluylenediisocyanate, the new diisocyanates are completely odorless and an irritation of the mucous membranes by these new diisocyanates has hitherto not been observed.

The subject of the present invention are thus new binuclear N-heterocyclic diisocyanates of formula wherein Z represents a divalent aliphatic, cycloaliphatic or araliphatic radical, and in particular preferably an alkylene radical or an alkylene radical which is interrupted by oxygen atoms, and $R_1$, $R_1'$, $R_2$ and $R_2'$ independently of one another each denote a hydrogen atom or an aliphatic, cycloaliphatic, araliphatic or aromatic hydrocarbon radical, such as especially a lower alkyl radical with one to four carbon atoms, alkenyl with two to four carbon atoms, cyclohexyl, cyclohexonyl or phenyl or wherein $R_1$ and $R_2$, and/or $R_1'$ and $R_2'$, together form a divalent aliphatic or cycloaliphatic hydrocarbon radical, preferably a tetramethylene or pentamethylene radical.

According to the invention, the new diisocyanates of formula (I) can be manufactured by reacting diamines of formula

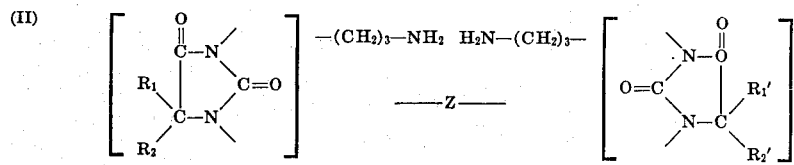

wherein Z, $R_1$, $R_1'$, $R_2$ and $R_2'$ have the same significance as in formula (I), with phosgene. In doing this, it is preferred to start from the hydrochlorides of the diamines of formula (II), which are then reacted with phosgene in o-dichlorobenzene or other organic inert solvents at 50° to 170° C. Another process consists of first converting the diamines of formula (II) by means of carbon dioxide into the corresponding carbamic acids or their betaine-like salts and then to phosgenate these. A further method is the dropwise addition of the solution of the diamines of formula (II) to a cooled solution of phosgene in an inert solvent. Furthermore, the new diisocyanates of formula (I) are produced according to a continuous process, in which phosgene and the diamine solution are simultaneously added to a hot, inert solvent, with the diisocyanate solution being withdrawn from the reaction vessel, equipped with an overflow, at the same rate as the addition of the diamine solution.

The diamines of formula (II) are obtained if the di-(β-cyanoethyl) compounds obtained by cyanethylation of the corresponding binuclear hydantoins of formula

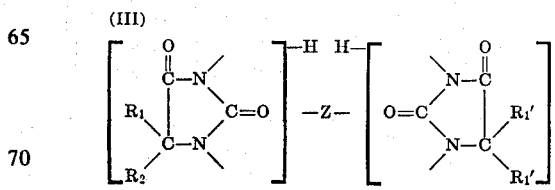

are hydrogenated in a manner which is in itself known.

The diisocyanates of formula (I) comprise two preferred subdivisions. The first subdivision of the new diisocyanates corresponds to the formula (IV)

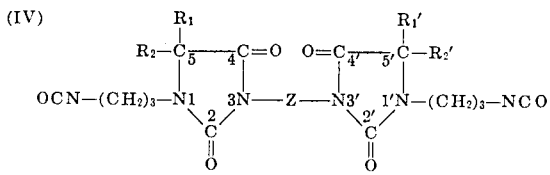

wherein Z, $R_1$, $R_1'$, $R_2$ and $R_2'$ have the significance indicated in formula (I).

As examples of the new diisocyanates of formula (IV) there may be mentioned: bis-(1'-γ-isocyanatopropylhydantoinyl-3')-methane; 1,2-bis-(1'-γ-isocyanatopropyl-5',5'-dimethyl-hydantoinyl-3')-ethane; 1,4-bis-(1'-γ-isocyanatopropyl-5'-methyl-5'-ethyl-hydantoinyl-3')-butane; 1,6-bis-(1'-γ-isocyanatopropyl-5'-isopropylhydantoinyl-3')-hexane; 1,12-bis-(1'-γ-isocyanatopropyl-5',5'-pentamethylenehydantoinyl-3')-dodecane and β,β'-bis-(1'-γ-isocyanatopropyl-5',5'-dimethyl-hydantoinyl-3')-diethyl-ether.

The second subdivision of the new diisocyanates corresponds to the formula (V)

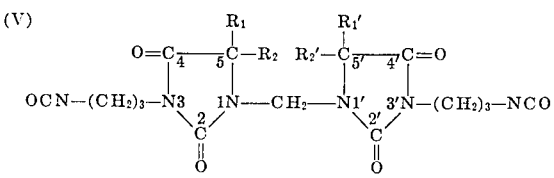

wherein $R_1$, $R_1'$, $R_2$ and $R_2'$ have the same significance as in formula (I).

As examples of the new diisocyanates of formula (V) there may be mentioned: 1,1'-methylene-bis-(3-γ-isocyanatopropylhydantoin); 1,1'-methylene-bis-(3-γ-isocyanatopropyl-5,5-dimethylhydantoin; 1,1'-methylene-bis-(3-γ-isocyanatopropyl-5-methyl-5-ethylhydantoin) and 1,1'-methylene-bis-(3-γ-iso-cyanatopropyl-5-isopropylhydantoin).

The binuclear hydantoins used as starting substances for the manufacture of the new diisocyanates of formula (IV) correspond to the formula (VI)

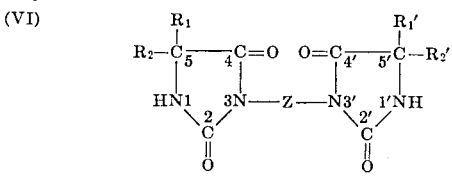

wherein Z, $R_1$, $R_1'$, $R_2$ and $R_2'$ have the same significance as in formula (I), and can be obtained in accordance with the process described in U.S. Pat. specification No. 3,296,208 by condensation of 1 mol of each of the two hydantoins of formulas

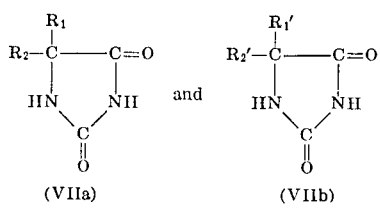

(VIIa)          (VIIb)

(VII a and VII b can be identical or different hydantoins) with 1 mol of a dihalide of formula Hal — Z — Hal          (VIII)

wherein Hal represents a halogen atom and Z has the same significance as in formula (I), in the presence of 2 equivalents of alkali.

The binuclear hydantoins used as starting substances for the manufacture of the new diisocyanates of formula (V) correspond to the formula (IX)

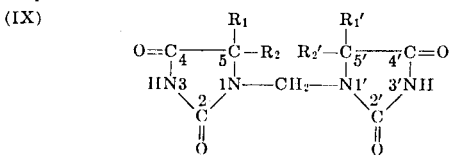

wherein $R_1$, $R_1'$, $R_2$ and $R_2'$ have the same significance as in formula (I), and can be easily obtained in accordance with the process of U.S. Pat. specification No. 2,417,999 by condensation of 2 mols of a hydantoin of formulas (VII a) and (VII b) with 1 mol of formaldehyde.

As initially mentioned, it is possible to add all hydrogen atoms replaceable by alkali in organic molecules to isocyanate groups. As examples of such compounds or classes of compounds there may be mentioned: alcohols, amines, carboxylic acids, phenols, ureas, urethanes, hydrazines, water, ammonia, hydrogen sulphates, imines, thioureas, sulphimides, amides, thiols, amino-alcohols, sulphonamides, hydrazones, semicarbazones, oximes, hydroxycarboxylic acids, aminocarboxylic acids as well as all polymers which contain active hydrogen atoms in the form of hydroxyl, carboxyl or amino groups and the like. The isocyanates of formula (I) can be employed for the polyaddition or crosslinking either by themselves or in mixtures with other isocyanates, diisocyanates or polyisocyanates. Depending on the nature and amount of the crosslinkings, it is possible to manufacture both very firm brittle compositions and also plastics with rubbery-elastic properties.

In order to manufacture thermoplastics, the diisocyanates of formula (I) can be reacted with glycols, such as ethylene glycol, 1,3-propylene glycol, 1,4-butanediol or with any desired dialcohols, which can also carry isocyclic, aromatic, heterocyclic or linear hetero groupings, as well as ester groupings.

Possible crosslinking agents or curing agents are above all those classes of compounds which yield three-dimensionally crosslinked, infusible and insoluble products with the diisocyanates of formula (I).

As crosslinking agent or curing agent of this nature, polyhydroxyl compounds are above all employed. The following may for example be mentioned: polyesters, containing hydroxyl groups, of adipic acid, phthalic acid or dimerised unsaturated fatty acids with diols and/or triols, such as ethylene glycol, 1,4-butanediol, 1,5-pentanediol, glycerine, and diethylene glycol; castor oil; linear or partially branched polypropylene ether glycols and polytetramethylene ether glycols; polythioether glycols and polyacetal glycols; sugars and sugar derivatives; higher-functional polyols, such as trimethylolpropane.

Further possible crosslinking agents are above all the polyamines, especially aromatic polyamines, such as 4,4'-diaminodiphenylmethane, as well as those compounds which simultaneously contain hydroxyl and amino groups, such as for example tri-isopropanolamine.

The polyaddition reaction of glycols, polyhydroxy compounds and polyamino compounds with the diisocyanates of formula (I) can be carried out directly without diluents, temperatures in the range of about 50° to 300° C. being required depending on the nature of the reaction components. It is also possible to carry out the process in diluents, for example halogenobenzenes.

The molecular weight of the polyurethane can be varied in a manner which is in itself known, depending on the variation of the molar ratio of the components, the removal of the heat of reaction from the melt, the increase in the dwell time in the dissolved state and the addition of monofunctional, that is to say chain-stopping, components. In general, it is necessary, for use in the plastics field, to polymerize up to an average molecular weight of about 6,000. Low molecular types are primarily of interest for the lacquer field.

The polyaddition reaction can also be carried out in the presence of accelerators; this is however not imperatively necessary. Possible catalysts are especially tertiary amines, such as pyridine, N,N'-dimethylpiperazine, N,N-dimethyl-benzylamine, tributylamine, triethylamine, N-methylmorpholine, N-methylpyrrole, N-methylpyrrolidine, diaza-(2,2,2)-bicyclooctane or diethyl-2-hydroxyethylamine, and also metal salts, such as $FeCl_3$, $AlCl_3$, $ZnCl_2$, $SnCl_2$, tin$''$ isooctoate, lead octoate, lead naphthenate and the dilaurate of tin-dibutyl. A survey of the most customary catalysts is furthermore to be found in "Houben-Weyl", 4th edition, volume XIV/2, on page 61 (Review by E. Müller).

For the manufacture of foams, blowing agents and surface-active substances, such as for example silicone compounds, as foam stabilizers can furthermore be conjointly used, in a manner which is in itself known.

The manufacture of polyurethane plastics products is as a rule carried out with simultaneous shaping to give castings, foam articles, pressings, lacquer films, laminates, adhesive bonds and the like. In manufacturing these, the procedure followed is that a mixture of the diisocyanate of formula (I) and the polyhydroxyl compound, as well as the optionally conjointly used catalyst and/or blowing agent, foam stabilizer and the like, is prepared and this mixture is then, after introduction into casting or pressing moulds, spreading as coatings, introduction into adhesive joints and the like, allowed to react, with application of heat, to give the plastic.

The subject of the present invention are therefore also moulding compositions which can be converted, under the influence of heat, into mouldings or foam articles, including two-dimensional structures, such as coatings or adhesive joints, and which contain (a) a binuclear N-heterocyclic diisocyanate of formula (I) and (b) a polyhydroxyl compound and also, optionally, a curing catalyst and/or blowing agents and foam stabilizers.

Of course further customary additives for polyisocyanate moulding compositions, such as fillers, reinforcing agents, mould release agents, antioxidants, anti-ageing agents, light protection agents, UV-absorbers, flameproofing substances, optical brighteners, dyestuffs or pigments can be added to the moulding compositions.

Suitable fillers or reinforcing agents are fibrous or pulverulent inorganic, as well as organic, substances. The following may be mentioned: quartz powder, aluminum oxide trihydrate, mica, aluminum powder, iron powder, iron oxide, ground dolomite, chalk powder, gypsum, slate powder, unburned kaolin (bolus), glass fibers, boron fibers, carbon fibers, asbestos fibers, and especially fillers of high water absorbency, such as for example anhydrous silicon dioxide, silica aerogel, anhydrous aluminum oxide, active charcoal, zeolites, bentonites and burned kaolin.

The moulding compositions can, in the unfilled or filled state, furthermore serve as dipping resins, casting resins, laminating resins, impregnating resins, lacquers, coating agents, sealing compositions, potting and insulating compositions for the electrical industry, or adhesives.

In addition to manual handling, the mechanical methods of handling for the manufacture of polyurethane plastics can appropriately be employed which permit continuous mixing of the diisocyanates (a) with the components (b) containing hydroxyl groups, to form a homogeneous melt. Thus the most diverse moulded articles (hard rubber substitute) can be manufactured by casting or by centrifugal moulding. Further uses exist in the field of casting compositions for filling joints by casting or sealing pipe couplings, and as floor surfacings or road surfacings, impression compositions or adhesives. It is simple to manufacture unsupported films, strips or filaments and to carry out impregnations or coatings of textiles, fiber materials (leather substitute) or paper. The new moulding compositions can, if the reaction speed is appropriately adjusted, for example serve for lining containers or for the manufacture of endless tubes of any profile by means of continuously operating heated injection moulding machines. Stiff foams or rigid foams manufactured from foam compositions according to the invention are for example used as insulating substances for buildings and refrigeration installations, as packaging materials and above all for shock absorption, for example as vibration-damping constructional units in automobile construction and machinery construction.

In the examples which follow parts denote parts by weight and percentages denote percentages by weight, unless otherwise stated. The relationship of parts by volume to parts by weight is as of the millilitre to the gram.

EXAMPLE 1

Hydrochloric acid gas was introduced for 30 minutes into a solution of 50.0 g of crude 1,1'-methylene-bis-(3-γ-aminopropyl-5,5-dimethylhydantoin) in 150 ml of absolute ethanol, while cooling in a bath of ice. The salt which precipitated in the course thereof was filtered off, washed with ice-cold absolute ethanol and dried, whereby 47.0 g of colorless hydrochloride of melting point 263° – 64° C. were obtained.

$C_{17}H_{30}N_6O_4 \cdot 2\, HCl$ (465.39)

| | | | |
|---|---|---|---|
| calculated: | C 44.84 | H 7.08 | N 18.46 % |
| found: | C 45.08 | H 6.77 | N 18.36 % |

Phosgene was first introduced for 4 hours at 120° C. and then for a further 4 hours at 140° C. into a suspension of 20.0 g (0.044 mol) of the hydrochloride in 250 ml of dry o-dichlorobenzene. The suspension thereby changed into a clear, light brown solution. This was concentrated to constant weight in vacuo. 16.1 g of light-brown colored 1,1'-methylene-bis-(3-γ-isocyanatopropyl-5,5-dimethylhydantoin) were left, with an isocyanate content of 16.85 percent (87 percent of theory). $C_{19}H_{26}N_6O_6$ (434.45)

| | | | |
|---|---|---|---|
| calculated: | C 52.50 | H 6.03 | N 19.35 % |
| found: | 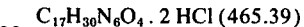 | | N 19.08 % |

The H-NMR (nuclear magnetic resonance) and IR (infrared) spectrum agree with the assumed structure. The resulting diisocyanate accordingly has the formula

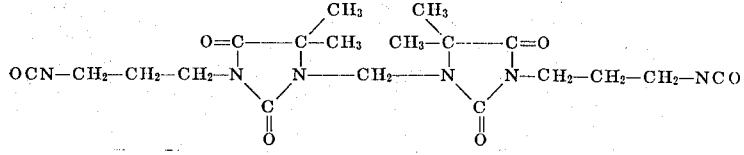

EXAMPLE 2

Hydrochloric acid gas was passed for 60 minutes into a solution of 697 g of crude 1,6-bis-[1'-(γ-aminopropyl)-5',5'-dimethylhydantoinyl-3']-n-hexane in 2,500 ml of absolute ethanol, while cooling in an ice bath. The salt which precipitated in the course of this was filtered off, washed with ice-cold absolute ethanol and dried, whereby 749 g of colorless hydrochloride of melting point 238° –40° C. were obtained.

$C_{22}H_{40}N_6O_4 \cdot 2\, HCl$ (525.52)

| | | |
|---|---|---|
| calculated: | Cl 13.49 | N 15.99 % |
| found: | Cl 13.11 | N 15.55 % |

Phosgene was passed for 8 hours at 150° C. into a suspension of 208 g (0.389 mol) of the hydrochloride in 2,000 ml of dry o-dichlorobenzene. In the course of this, the suspension changes into an almost clear, light brown solution. The slight precipitate was filtered off and the clear solution was concentrated in vacuo to constant weight. 198.0 g of brown-colored, initially viscous, slowly crystallizing 1,6-bis-[1'-(γ-isocyanatopropyl)-5',5'-dimethylhydantoinyl-3']-n-hexane were left, with an isocyanate content of 15.4 percent (92.4 percent of theory).

The H-NMR and IR spectrum agree with the assumed structure. Accordingly, the resulting diisocyanate has the formula

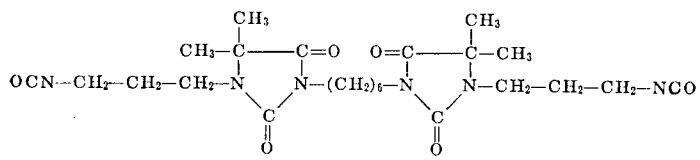

EXAMPLE 3

A solution of 30.0 g of β,β'-bis-[1'-(γ-aminopropyl)-5',5'-dihydantoinyl-3']-diethyl ether in 40 ml of chloroform was slowly added dropwise, with good cooling and vigorous stirring, to a mixture of chloroform/diethyl ether in the weight ratio of 1:1, and at the same time hydrochloric acid gas was passed into this solvent mixture. As a result, the hydrochloride precipitated as an almost colorless, solid resin, which weighed 31.0 g after filtering off and drying. Phosgene was passed into a suspension of 18.0 g (0.035 mol) of the powdered hydrochloride in 300 ml of o-dichlorobenzene at 140° C. for 6 hours, with vigorous stirring. In the course thereof, the suspension changed to a clear brown solution which was concentrated to constant weight in vacuo. 17.2 g of brown, highly viscous β,β'-bis-[1'-(γ-isocyanatopropyl)-5',5'-dimethylhydantoinyl-3']-diethyl ether were left, with an isocyanate content of 14.3 percent (83.6 percent of theory).

The H-NMR and IR spectrum agree with the assumed structure.

Accordingly, the resulting diisocyanate has the formula:

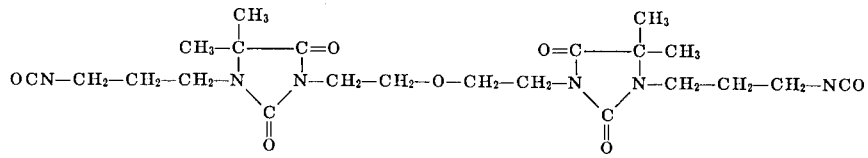

EXAMPLE 4

A glass vessel which could be heated and was provided with an overflow was charged with dry o-dichlorobenzene and the latter heated to about 165° C. A solution of 20.0 g of 1,1'-methylene-bis-(3-γ-aminopropyl-5-isopropylhydantoin) in 380 ml of dry o-dichlorobenzene was added dropwise at this temperature over the course of 200 minutes, whilst phosgene was simultaneously passed into the vessel. The liquid volume in the reactor was always constant, since a diisocyanate solution was withdrawn by means of the overflow corresponding to the addition of diamine solution. After completion of the addition, the solvent was distilled off and 21.1 g of viscous substance with an isocyanate content of 17.24 percent (95 percent of theory) remained.

| elementary analysis: | $C_{21}H_{30}N_6O_6$ | (462.5) | | |
|---|---|---|---|---|
| calculated: | C 54.53 | H 6.54 | N 18.17 % | |
| found: | C 54.58 | H 6.41 | N 17.76 % | |

The H-NMR and IR spectrum agree with the assumed structure. Accordingly, the resulting diisocyanate has the formula:

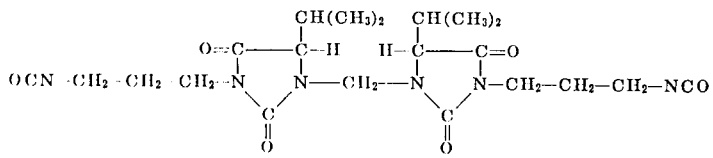

USE EXAMPLE 10 g portions of a 60 percent strength solution of a polyester-alcohol with an acid number of less than 4 and an OH group content of about 8 percent (a commercial product available from Messrs. Bayer under the registered trade name "Desmophen 650") in an organic solvent mixture consisting of ethylglycol acetate/methyl ethyl ketone/toluene in a weight ratio of 1:1:1 were mixed, in a first sample, with 8.2 g of 1,1'-methylene-bis-(3-γ-isocyanatopropyl-5,5-dimethylhydantoin (diisocyanate A) and in second samples with 7.90 g of 1,6-bis-(1'-(γ-isocyanatopropyl-5',5'-dimethylhydantoinyl-3')-n-hexane (diisocyanate B) (ratio of HO groups to OCN groups = 1:1). 50 percent strength lacquer solutions were prepared in each case by adding further solvent mixture of ethylglycol acetate/methyl ethyl ketone/toluene in the weight ratio of 1:1:1. These lacquer solutions were applied to previously cleaned aluminum sheets, cured under the conditions indicated in the table below, and the properties of the cured lacquer subsequently determined.

By way of comparison, two known 50 percent strength lacquer solutions were manufactured, wherein, instead of the new diisocyanates A or B, 2.4 g of 1.6-hexamethylene-diisocyanate (diisocyanate C) or 7.2 g of a trifunctional polyisocyanate (polyisocyanate D) containing biuret groups and obtainable by reaction of 3 mols of 1,6-hexamethylenediisocyanate with 1 mol of water, which is commercially available from Messrs. Bayer under the registered trade name "-Desmodur N", were used respectively. The known diisocyanate or polyisocyanate C and D respectively were mixed with the same amount of "Desmophen 650" (10 g) and the same organic solvent mixture, and the lacquer solutions thus obtained were applied, cured and tested as described above.

The table which follows contains the comparison of the properties of lacquers which were manufactured using diisocyanates A, B and C and polyisocyanate D. Table: Properties of lacquer solutions of polyester alcohol ("Desmophen 650") and various diisocyanates or polyisocyanates.

| | Diisocyanate A | Diisocyanate B | Diisocyanate C | Diisocyanate D |
|---|---|---|---|---|
| pot life of a 50% strength lacquer solution in ethylglycol acetate: methyl ethyl ketone: toluene (= 1:1:1 parts by weight) at 20°C/65% relative humidity the lacquer is dust-dry after | 2-3 days | 2-3 days | 2.0 days | 1.5 days |
| after curing at 20°C the pendulum hardness according to Persoz is: | 19 hours | 15 hours | 19 hours | 18.5 hours |
| after 1 day | 90 | 92 | 111 | 88 |
| 3 days | 243 | 196 | 288 | 285 |
| 7 days | 335 | 220 | 330 | 346 |
| pendulum hardness according to Persoz (after curing at 120°C for 60 minutes) | 390 | 390 | 395 | 390 |
| resistance to acetone after curing at 120°C/60 minutes at 150°C/120 minutes | tacky scratch-resistant | tacky scratch-resistant | tacky scratch-resistant | tacky scratch resistant |

The comparison shows that the pot life of lacquer solutions based on the diisocyanate A according to the invention and the diisocyanate B according to the invention is longer than that of the two other lacquer solutions based on diisocyanate C and polyisocyanate D.

The pendulum hardness measured on lacquers after 1 day's curing at 20° C. or after 1 hour's curing at 120° C. shows that using the bifunctional diisocyanates A and B lacquers are obtained which surprisingly are of equally high hardness as lacquers based on the trifunctional polyisocyanate D. Since lacquers which are based on trifunctional polyisocyanates, for example polyisocyanate D, possess a higher density of cross-linking points, it would have been expected that the lacquers from the diisocyanates A and B would show distinctly worse properties. The lacquers based on the diisocyanates or polyisocyanates A, B or D are acetone-resistant after two hours curing at 150° C., in contrast to a lacquer based on diisocyanate C. This diisocyanate, which admittedly also yields lacquers of usable hardness, is however not directly used as a lacquer raw material because of its relatively high vapor pressure and the toxic effects resulting therefrom.

We claim:

1. A diisocyanate of formula

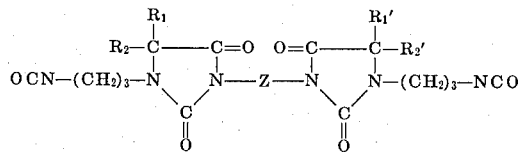

wherein Z represents alkylene of up to 12 carbon atoms which may be interrupted by oxygen atoms, and $R_1$, $R_1'$ $R_2$ and $R_2'$ each represents a member selected from the group consisting of hydrogen atom, alkyl of one to four carbon atoms, alkenyl of two to four carbon atoms, cyclohexyl, cyclohexenyl and phenyl or wherein $R_1$ and $R_2$, and/or $R_1'$ and $R_2'$, together form a divalent residue selected from the group consisting of tetramethylene and pentamethylene.

2. A diisocyanate of formula

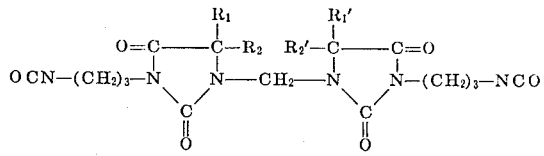

wherein $R_1$, $R_1'$, $R_2$ and $R_2'$ each represents a member selected from the group consisting of hydrogen atom, alkyl of one to four carbon atoms, alkenyl of two to four carbon atoms, cyclohexyl, cyclohexenyl and phenyl or wherein $R_1$ and $R_2$, and/or $R_1'$ and $R_2'$, together form a divalent residue selected from the group consisting of tetramethylene and pentamethylene.

3. 1,1'-Methylene-bis-(3-γ-isocyanatopropyl-5,5-dimethylhydantoin).

4. 1,1'-Methylene-bis-(3-γ-isocyanatopropyl-5-isopropylhydantoin).

5. 1,6-Bis-[1'-γ-isocyanatopropyl-5',5'-dimethylhydantoinyl-3']-n-hexane.

6. β,β'-Bis-[1'-γ-isocyanatopropyl-5',5'-dimethylhydantoinyl-3']-diethyl-ether.

* * * * *

PO-1050
(5/69)

UNITED STATES PATENT OFFICE
CERTIFICATE OF CORRECTION

Patent No. 3,676,455           Dated July 11, 1972

Inventor(s) THEOBALD HAUG ET AL

It is certified that error appears in the above-identified patent and that said Letters Patent are hereby corrected as shown below:

Cover page, after "[73] Assignee:" delete Ciba Geigy Corporation" and insert --- CIBA-GEIGY AG, Basle, Switzerland ---.

Signed and sealed this 23rd day of April 1974.

(SEAL)
Attest:

EDWARD M. FLETCHER, JR.
Attesting Officer

C. MARSHALL DANN
Commissioner of Patents